(12) United States Patent
Prakash et al.

(10) Patent No.: US 9,837,855 B2
(45) Date of Patent: Dec. 5, 2017

(54) UNINTERRUPTIBLE POWER SUPPLY CONTROL

(71) Applicant: SCHNEIDER ELECTRIC IT CORPORATION, West Kingston, RI (US)

(72) Inventors: Indra Prakash, Bihar (IN); Sriya Dupakuntla, Vijayawada (IN)

(73) Assignee: SCHNEIDER ELECTRIC IT CORPORATION, West Kingston, RI (US)

(*) Notice: Subject to any disclaimer, the term of this patent is extended or adjusted under 35 U.S.C. 154(b) by 210 days.

(21) Appl. No.: 14/893,791

(22) PCT Filed: May 30, 2013

(86) PCT No.: PCT/US2013/043330
§ 371 (c)(1),
(2) Date: Nov. 24, 2015

(87) PCT Pub. No.: WO2014/193385
PCT Pub. Date: Dec. 4, 2014

(65) Prior Publication Data
US 2016/0111916 A1    Apr. 21, 2016

(51) Int. Cl.
*H02J 9/06* (2006.01)

(52) U.S. Cl.
CPC .............. *H02J 9/061* (2013.01); *H02J 9/062* (2013.01); *H02J 2009/068* (2013.01)

(58) Field of Classification Search
CPC ....... H02J 9/061; H02J 9/062; H02J 2009/068
See application file for complete search history.

(56) References Cited

U.S. PATENT DOCUMENTS

| 4,087,697 A | 5/1978 | Johnson |
| 4,641,042 A | 2/1987 | Miyazawa |
| 4,782,241 A | 11/1988 | Baker et al. |

(Continued)

FOREIGN PATENT DOCUMENTS

DE    2743957 A1    4/1978

OTHER PUBLICATIONS

Notification of Transmittal of the International Search Report and the Written Opinion of the International Searching Authority from corresponding PCT/US2013/043330 dated Nov. 1, 2013.

(Continued)

*Primary Examiner* — Robert Deberadinis
(74) *Attorney, Agent, or Firm* — Lando & Anastasi, LLP

(57) ABSTRACT

According to one aspect, embodiments herein provide a UPS comprising a first input configured to receive input power, a second input configured to receive backup power, an output, a bypass line selectively coupled between the first input and the output via a bypass switch, wherein in a bypass mode of operation, the bypass switch is closed and the input power is provided directly to the output, an inverter comprising an input configured to receive at least one of the input power and the backup power and an output selectively coupled to the output of the UPS via an inverter switch, wherein in an online mode of operation, the inverter switch is closed and the inverter converts the input power into the output AC power, and means for operating the inverter to force commutate current in the bypass line after a transition from the bypass to the online mode of operation.

20 Claims, 4 Drawing Sheets

(56) References Cited

U.S. PATENT DOCUMENTS

| | | |
|---|---|---|
| 6,201,371 B1 | 3/2001 | Kawabe et al. |
| 2008/0157601 A1 | 7/2008 | Masciarelli et al. |
| 2010/0110731 A1 | 5/2010 | Murai |

OTHER PUBLICATIONS

Extended European Search Report from corresponding European Application No. 13885470.8 dated Dec. 20, 2016.

UNINTERRUPTIBLE POWER SUPPLY CONTROL

CROSS-REFERENCE TO RELATED APPLICATIONS

This application is a U.S. National Stage Application under 35 U.S.C. §371 of International Application No. PCT/US2013/043330, filed May 30, 2013, titled UNINTERRUPTIBLE POWER SUPPLY CONTROL, which is hereby incorporated herein by reference in its entirety.

BACKGROUND OF INVENTION

1. Field of Invention

At least some embodiments described herein relate generally to Uninterruptible Power Supplies (UPS).

2. Discussion of Related Art

The use of power devices, such as uninterruptible power supplies (UPS), to provide regulated, uninterrupted power for sensitive and/or critical loads, such as computer systems and other data processing systems, is known. Known uninterruptible power supplies include on-line UPS's, off-line UPS's, line interactive UPS's as well as others. On-line UPS's provide conditioned AC power as well as back-up AC power upon interruption of a primary source of AC power. Typical on-line UPS's may also operate in a bypass mode where unconditioned power with basic protection is provided directly from an AC power source to a load via a bypass line.

SUMMARY OF INVENTION

At least one aspect of the invention is directed to an Uninterruptible Power Supply (UPS) comprising a first input configured to be coupled to an AC source and to receive input power, a second input configured to be coupled to a backup power source to receive backup power, an output configured to be coupled to a load and to provide output AC power to the load derived from at least one of the input power and the backup power, a bypass line selectively coupled between the first input and the output via a bypass switch, wherein the bypass switch is configured to close in a first mode of operation, coupling the first input of the UPS to the output of the UPS via the bypass line, and to open in a second mode of operation, decoupling the first input of the UPS from the output of the UPS, an inverter comprising an input configured to receive at least one of the input power and the backup power and an output selectively coupled to the output of the UPS via an inverter switch, wherein the inverter switch is configured to close in the second mode of operation, coupling the output of the inverter to the output of the UPS, and to open in the first mode of operation, decoupling the output of the inverter from the output of the UPS, and an inverter controller coupled to the inverter and to the bypass line, wherein the inverter controller is configured, in the second mode of operation, to monitor current in the bypass line and, in response to a determination that the current in the bypass line is greater than a threshold level, to operate the inverter to provide current to the output of the UPS having a direction opposite to a direction of the current in the bypass line.

According to one embodiment, the inverter controller is further configured, in the second mode of operation and in response to a determination that the current in the bypass line is less than the threshold level, to operate the inverter to provide AC power to the output of the UPS. In one embodiment, the inverter controller is coupled to the bypass line via a current sensor. In another embodiment, the inverter controller comprises an inverter control module coupled to the inverter, and a bypass current magnitude detection circuit coupled to the inverter control module and to the current sensor, wherein, in the second mode of operation, the bypass current magnitude detection circuit is configured to receive an indication of current in the bypass line from the current sensor and, based on the indication of current in the bypass line, to provide an indication to the inverter control module whether current in the bypass line is greater than the threshold level.

According to another embodiment, in response to an indication that the current in the bypass line is greater than the threshold level, the inverter control module is configured to control the inverter to operate as a current source. In one embodiment, in response to an indication that the current in the bypass line is less than the threshold level, the inverter control module is configured to control the inverter to operate as a voltage source. In another embodiment, the inverter controller further comprises a bypass current direction detection circuit coupled to the inverter control module and the current sensor and configured to receive an indication of current in the bypass line from the current sensor and, based on the indication of current in the bypass line, to provide an indication of the direction of the current in the bypass line to the inverter control module.

According to one embodiment, the UPS further comprises a UPS controller coupled to the first input, the bypass switch and the inverter switch, wherein the UPS controller is configured to monitor the AC power at the first input, wherein, in response to a determination that the AC power at the first input is acceptable, the UPS controller is further configured to control the UPS to operate in the first mode of operation, and wherein, in response to a determination that the AC power at the first input is not acceptable, the UPS controller is further configured to control the UPS to operate in the second mode of operation. In one embodiment, in the second mode of operation, the output is configured to provide output AC power to the load derived from the backup power. In another embodiment, in the second mode of operation, the output is configured to provide output AC power to the load derived from the input power.

According to one embodiment, the UPS further comprises a bypass relay protection circuit coupled to the bypass switch and configured to monitor the current in the bypass line and prevent operation of the bypass switch in response to a determination that the current in the bypass line is above a cutoff level.

Another aspect of the invention is directed to a method for operating a UPS, the UPS having an input, an output, a bypass line selectively coupled between the input and the output, and an inverter, the method comprising monitoring input AC power provided to the input of the UPS from an AC power source, determining whether the input AC power provided to the input is acceptable, in response to a determination that the input AC power is acceptable, providing the input AC power to the output of the UPS via the bypass line, in response to a determination that the input AC power is not acceptable, severing the connection between the input and the output via the bypass line and enabling the inverter, monitoring current in the bypass line, determining, in response to monitoring, whether the current in the bypass line exceeds a threshold level, and in response to a determination that current in the bypass line exceeds the threshold level, operating the inverter to provide an output current to the output of the UPS having a direction opposite to a direction of the current in the bypass line.

According to one embodiment, the method further comprises in response to a determination that current in the bypass line does not exceed the threshold level, operating the inverter to provide output AC power at a controlled voltage to the output of the UPS. In one embodiment, operating the inverter to provide output AC power to the output of the UPS comprises receiving a reference sine wave signal from a sine wave reference generation circuit, monitoring voltage at the output of the inverter, and operating the inverter to provide the output AC power to the output of the UPS based on the reference sine wave signal and the monitored voltage at the output of the inverter.

According to another embodiment, operating the inverter to provide an output current to the output of the UPS having a direction opposite to a direction of the current in the bypass line includes operating the inverter as a current source. In one embodiment, operating the inverter as a current source comprises receiving an indication of current in the bypass line from a current sensor coupled to the bypass line, determining, with a direction detection circuit, the direction of current in the bypass line, and transmitting, based on determining the direction of current in the bypass line, signals to the inverter to control the inverter to provide the output current having a direction opposite to the direction of the current in the bypass line.

According to another embodiment, severing the connection between the input and the output via the bypass line includes opening a bypass switch selectively coupled between the input and the output on the bypass line. In one embodiment, enabling the inverter includes closing an inverter switch coupled between an output of the inverter and the output of the UPS. In another embodiment, the method further comprises preventing severance of the connection between the input and the output via the bypass line in response to a determination that the current in the bypass line exceeds a cutoff level.

At least one aspect of the invention is directed to an Uninterruptible Power Supply (UPS) comprising a first input configured to be coupled to an AC source and to receive input power, a second input configured to be coupled to a backup power source to receive backup power, an output configured to be coupled to a load and to provide output AC power to the load derived from at least one of the input power and the backup power, a bypass line selectively coupled between the first input and the output via a bypass switch, wherein in a bypass mode of operation, the bypass switch is closed and the input power is provided directly to the output, an inverter comprising an input configured to receive at least one of the input power and the backup power and an output selectively coupled to the output of the UPS via an inverter switch, wherein in an online mode of operation, the inverter switch is closed, the inverter receives the input power, and the inverter converts the input power into the output AC power, and means for operating the inverter to force commutate current in the bypass line after a transition from the bypass mode of operation to the online mode of operation.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
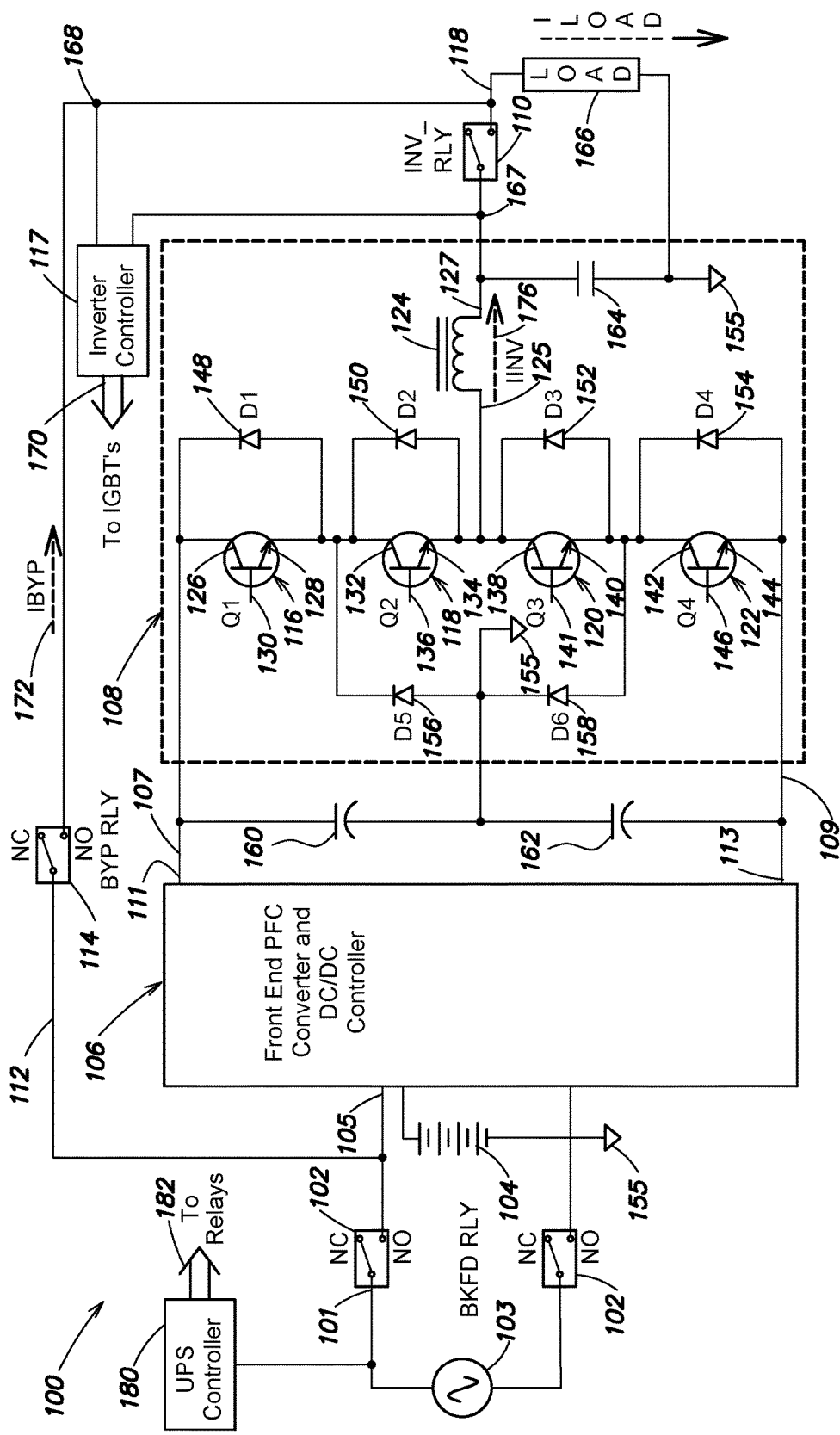
FIG. 1 illustrates an online UPS according to aspects of the current invention.

Various embodiments and aspects thereof will now be discussed in detail with reference to the accompanying drawings. It is to be appreciated that this invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

As discussed above, typical on-line UPS's may operate in a bypass mode where unconditioned power is provided through a bypass switch directly from an AC power source (e.g., AC mains) to a load via a bypass line. In the event of a disturbance at the AC mains (e.g., a sag or swell condition), the on-line UPS may enter an online mode or battery mode in which the bypass line is disconnected from the load by opening the bypass switch and the on-line UPS is operated to condition power provided by the AC mains or battery and provide the conditioned power to an output coupled to the load. After the transition of the bypass switch from closed to open, the bypass line may still carry current for a period of time (e.g., 10 ms) and act as a short between the output of the on-line UPS and AC mains (e.g., due to arcing between contacts of the bypass switch). If the bypass switch is a Silicon-Controlled Rectifier (SCR), the bypass switch will only cease to conduct at natural current zero. This may potentially result in a large circulating current between AC mains and the inverter which may result in a rise in DC-link voltage and the load being dropped. To prevent this, a large transfer time delay (e.g., 10-13 ms) between disconnecting the bypass line and turning on the inverter may be utilized. This transfer time delay may result in an undesired interruption of power to the load.

In at least some embodiments described herein, a UPS control architecture is provided in which, upon transfer from the bypass mode to the online mode, an inverter within an online UPS is controlled to operate as a current source to deliver current in the opposite direction to that of current in the bypass line. This may force current in the bypass line to zero, thereby preventing the inverter from shorting to AC mains. Once current in the bypass line goes to zero, the inverter is controlled to operate as a voltage source. According to at least one embodiment, using this approach, the transfer time delay may be reduced to as low as 1 ms.

FIG. 1 illustrates an online UPS 100 according to aspects of the current invention. The UPS 100 includes an input 101, a UPS controller 180, a backfeed relay 102, a battery 104, a front end Power Factor Correction (PFC) converter and DC/DC controller 106, a positive DC bus 107, a negative DC bus 109, an inverter 108, an inverter relay 110, a bypass line 112, a bypass relay 114, an inverter controller 117, and an output 118. The inverter 108 includes a first switch 116, a second switch 118, a third switch 120, a fourth switch 122, and an inductor 124. According to one embodiment, the switches 116-122 within the inverter 108 are Insulated-Gate Bipolar Transistors (IGBT); however, in other embodiments, other types of switches or transistors may be utilized, and in addition other types of inverters may be used.

The input 101 of the UPS 100 is configured to be coupled to an AC source 103 (e.g., AC mains). The UPS controller 180 is coupled to the input 101, the backfeed relay 102, the bypass relay 114, the inverter relay 110 and to the inverter 108. The input 101 of the UPS 100 is also coupled to an input 105 of the PFC converter and DC/DC controller 106 via the backfeed relay 102. The battery 104 is coupled between the PFC converter and DC/DC controller 106 and ground 155. The bypass line 112 is coupled between the input 105 of the PFC converter and DC/DC controller 106 and the output 118 of the UPS 100 via the bypass relay 114.

The positive DC bus 107 is coupled between a positive output 111 of the PFC converter and DC/DC controller 106 and the collector 126 of the first switch 116. The emitter 128 of the first switch is coupled to the collector 132 of the second switch 118. The emitter 134 of the second switch 118 is coupled to the collector 138 of the third switch 120. The emitter 140 of the third switch 120 is coupled to the collector 142 of the fourth switch 122. The emitter 144 of the fourth switch 122 is coupled to a negative output 113 of the PFC converter and DC/DC controller 106 via the negative bus 109. A first diode 148 is coupled between the collector 126 and the emitter 128 of the first switch 116. A second diode 150 is coupled between the collector 132 and emitter 134 of the second switch 118. A third diode 152 is coupled between the collector 138 and emitter 140 of the third switch 120. A fourth diode 154 is coupled between the collector 142 and emitter 144 of the fourth switch 122.

A first capacitor 160 is coupled between the positive bus 107 and ground 155. A second capacitor 162 is coupled between the negative bus 109 and ground 155. A fifth diode 156 is coupled between ground 155 and the collector 132 of the second switch 118. A sixth diode 158 is coupled between ground 155 and the collector of the fourth switch 122.

An input 125 of the inductor 124 is coupled to the collector 138 of the third switch 120. The output 127 of the inductor 124 is coupled to the inverter relay 110. The inverter relay 110 is coupled between the output 127 of the inductor 124 and the output 118 of the UPS 100. A third capacitor 164 is coupled between the output 127 of the inductor 124 and ground 155. The output 118 of the UPS 100 is configured to be coupled to a load.

The inverter controller 117 is coupled to the bypass line 112 and to the output 118 of the UPS 100. The inverter controller 117 is also coupled to the gate 130, 136, 141, 146 of each switch 116-122 within the inverter 108.

Based on the AC power received from AC mains 103, the UPS 100 is configured to operate in different modes of operation. For example, according to one embodiment, the UPS controller 180 monitors the AC power received from AC mains 103 at the input 101 and, based on the monitored AC power, sends control signals 182 to the backfeed relay 102, the bypass relay 114, the inverter relay 110, and the inverter 108 to control the operation of the UPS 100.

In response to a determination that the AC power received from AC mains 103 is acceptable (e.g., at a desired level), the UPS controller 180 operates the UPS 100 to enter a "bypass" mode of operation. In the "bypass" mode of operation, the UPS controller 180 transmits control signals 182 to close the backfeed relay 102, to close the bypass relay 114, and to close the inverter relay 110. In the "bypass" mode of operation, the UPS controller 180 also transmits control signals 182 to the inverter 108 to turn off the inverter 108. For example, in one embodiment, the UPS controller 180 turns off the inverter 108 by transmitting control signals 182 to the switches 116, 118, 120, 122 within the inverter 108 to disable the switches 116, 118, 120, 122. Accordingly, in the "bypass" mode of operation, the input 101 of the UPS 100 (coupled to AC mains 103) is coupled directly to the output 118 of the UPS 100 via the bypass line 112 and unconditioned AC power received at the input 101 from AC mains 103 is provided directly to the output 118 to power a load 166. Also in the "bypass" mode of operation, the PFC converter and DC/DC controller 106 operates to maintain the voltage on the DC busses 107, 109.

In response to a determination that the AC power received from AC mains 103 is in a sag or swell condition, the UPS controller 180 operates the UPS 100 to enter an "on-line" mode of operation. In the "on-line" mode of operation, the UPS controller 180 transmits control signals 182 to close the backfeed relay 102, to close the inverter relay 110, to open the bypass relay 114, and to turn on the inverter 108. According to one embodiment, to turn on the inverter 108, the UPS controller 180 transmits control signals 182 to the switches 116, 118, 120, 122 within the inverter 108 to enable the switches 116, 118, 120, 122. Once enabled, the switches 116, 118, 120, 122 may be controlled (i.e., turned on and off) by the inverter controller 117. Accordingly, the PFC converter and DC/DC controller 106 receives AC power from AC mains 103 at its input 105. The PFC converter and DC/DC controller 106 converts the AC power into DC power, and provides positive DC power to the positive DC bus 107 via its positive output 111 and provides negative DC power to the negative DC bus 109 via its negative output 113. DC power on the positive 107 and negative 109 busses is provided to the inverter 108.

When the inverter 108 is turned on, the switches 116, 118, 120, 122 within the inverter 108 are operated (i.e., turned on and off) by the inverter controller 117, in conjunction with the inductor 124 and the third capacitor 164, to convert the DC power received from the positive 107 and negative 109 busses into desired AC power. According to one embodiment, the inverter controller 117 monitors current and voltage at the output 167 of the inverter 108 and operates the switches 116, 118, 120, 122 to generate desired AC power at the output 167 of the inverter 108 based on the monitored current and voltage. In one embodiment, the inverter controller 117 operates the switches by sending control signals 170 to the gates 130, 136, 141, 146 of the switches 116, 118, 120, 122. The desired AC power generated by the inverter 108 is provided to the output 118 of the UPS 100 to power the load 166. Also in the "on-line" mode of operation, DC power generated by the PFC converter and DC/DC controller 106 is provided to the battery 104 to charge the battery 104.

In response to a determination that the AC power received from AC mains is in a brownout or blackout condition, the UPS controller 180 operates the UPS 100 to enter a "battery" mode of operation. In the "battery" mode of operation, the UPS controller 180 transmits control signals 182 to open the backfeed relay 102, to close the inverter relay 110, and to turn on the inverter 108. DC power from the battery 104 is provided to the PFC and DC/DC controller 106 as the battery 104 discharges. The PFC converter and DC/DC controller 106 converts the DC power received from the battery 104 into DC power at a desired level and provides the desired DC power to the positive 107 and negative 109 DC buses. DC power on the positive 107 and negative 109 busses is provided to the inverter 108.

When the inverter 108 is on, the switches 116, 118, 120, 122 within the inverter 108 are operated (i.e., turned on and off) by the inverter controller 117, in conjunction with the inductor 124 and the third capacitor 164, to convert the DC power received from the positive 107 and negative 109 busses into desired AC power. The converted AC power generated by the inverter 108 is provided to the output 118 of the UPS 100 to power the load 166.

In addition to controlling the operation of the switches 116-122 during the "on-line" and "battery" modes of operation, the inverter controller 117 also monitors the bypass line 112 and operates to commutate current in the bypass line 112 when the UPS 100 transitions from the "bypass" mode of operation to the "online" or "battery" modes of operation and forces the current in the bypass line 112 to zero. According to one embodiment, the inverter controller 117 monitors the current in the bypass line 112 via a Hall Effect sensor 168; however, in other embodiments, a different type of current sensor may be utilized.

In the event of AC mains 103 failure detection (e.g., due to a sag, swell, brownout, or blackout condition), the bypass relay 114 is driven open, the inverter relay 110 is maintained closed, and the inverter 108 is turned on. However, despite the opening of the bypass relay 114, the bypass line 112 may still carry current (e.g., due to arcing) and act as a short between the output 118 of the UPS 100 and AC mains 103. According to one embodiment, as long as the inverter controller 117 senses current 172 in the bypass line 112 (e.g., via the Hall Effect sensor 168), the inverter controller 117 operates the inverter 108 (i.e., operates the switches 116-122) to run as a current source to deliver current 176 to the output 118 in the opposite direction to that of current 172 in the bypass line 112. This forces the current 172 in the bypass line to zero, preventing the inverter 108 from shorting to AC mains 103. Once current 172 in the bypass line goes to zero, the inverter controller 117 operates the inverter 108 (i.e., operates the switches 116-122) as a voltage source to provide desired power to the load 166. By force commutating the current 172 in the bypass line 112, the transfer time delay between transferring from "bypass" mode to "online" mode may be reduced to as low as 1 ms.

Figure 2A:
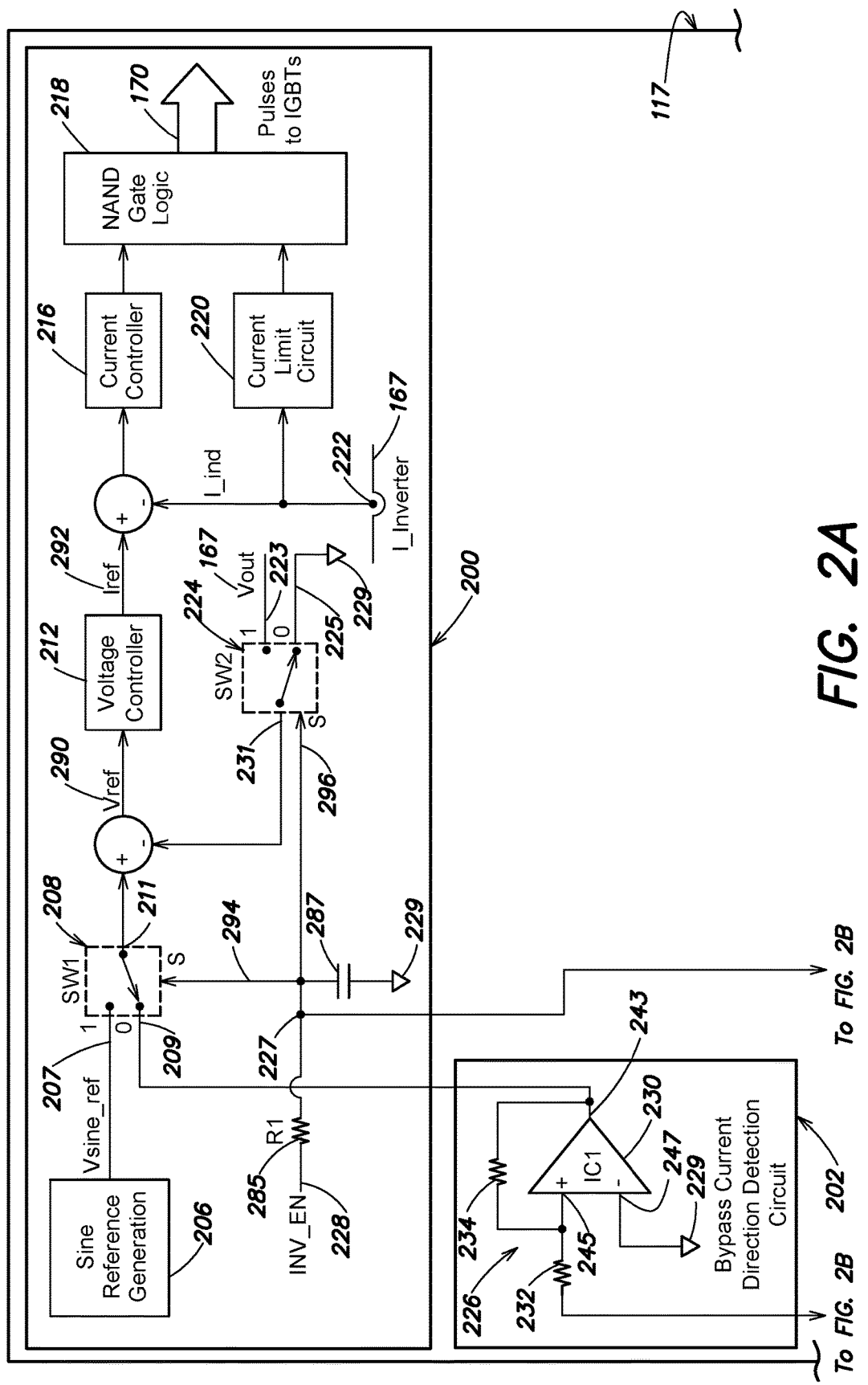
FIGS. 2A and 2B illustrate an inverter controller according to aspects of the current invention.
Figure 2B:
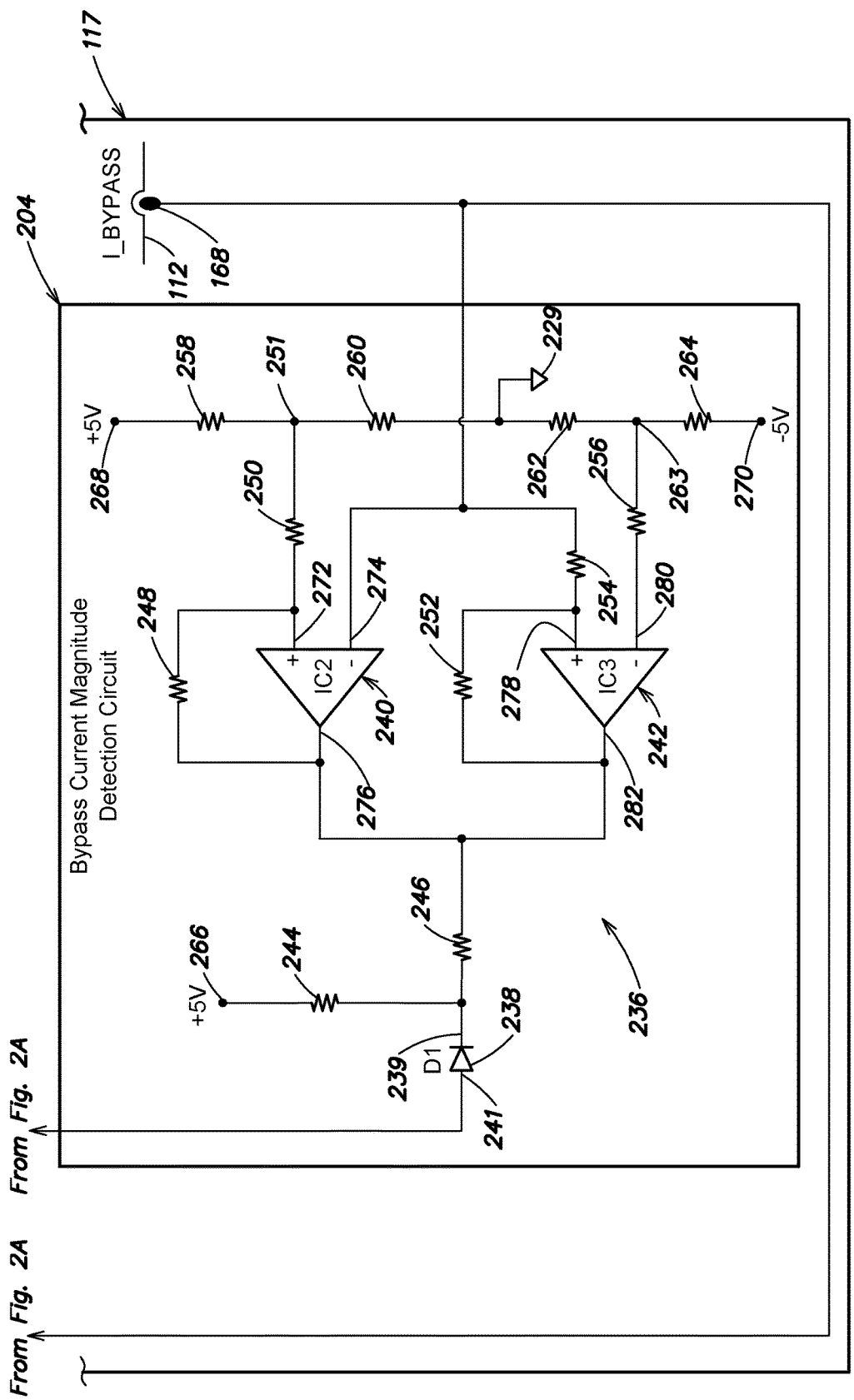

The inverter controller 117 is discussed in greater detail below with regards to FIGS. 2A and 2B. FIGS. 2A and 2B illustrate the inverter controller 117 according to embodiments described herein. The inverter controller 117 includes an inverter control module 200, a bypass current direction detection circuit 202, and a bypass current magnitude detection circuit 204. The inverter control module 200 includes a sine wave reference generation circuit 206, a first switch 208, a voltage controller 212, a current controller 216, a current limit circuit 220, NAND gate logic 218, and a second switch 224. The bypass current direction detection circuit 202 includes a comparator 226. The comparator 226 includes an operational amplifier 230, a first resistor 232, and a second resistor 234. The bypass current magnitude detection circuit 204 includes a level comparator 236 and a diode 238. The level comparator 236 includes a first operational amplifier 240, a second operational amplifier 242, and a plurality of resistors 244-264.

The sine wave reference generation circuit 206 of the inverter control module 200 is coupled to a first input 207 of the first switch 208. The output 243 of the operational amplifier 230 within the comparator 226 is coupled to a second input 209 of the first switch 208. The positive terminal 245 of the operational amplifier 230 is coupled to the output 243 via the second resistor 234. The positive terminal 245 is coupled to the bypass line 112 (e.g., with a Hall Effect sensor 168) via the first resistor 232. The negative terminal 247 of the operational amplifier 230 is coupled to ground 229.

The negative terminal 274 of the first operational amplifier 240 within the level comparator 236 is also coupled to the bypass line via the Hall Effect sensor 168. The negative terminal 274 of the first operational amplifier 240 is also coupled to the positive terminal 278 of the second operational amplifier 242 within the level comparator 236 via a resistor 254. The positive terminal 272 of the first operational amplifier 240 is coupled to the output 276 of the first operational amplifier 240 via a resistor 248. The positive terminal 272 of the first operational amplifier 240 is also coupled to a node 251 via a resistor 250. The node 251 is coupled to positive supply voltage (e.g., +5V) 268 via a resistor 258 and to ground 229 via a resistor 260. The output 276 of the first operational amplifier 240 is coupled to the output 282 of the second operational amplifier 242.

The positive terminal 278 of the second operational amplifier 242 is also coupled to the output 282 of the second operational amplifier 242 via a resistor 252. The negative terminal 280 of the second operational amplifier 242 is coupled to a node 263 via a resistor 256. The node is coupled to a negative supply voltage (e.g., −5V) 270 via a resistor 264 and to ground 229 via a resistor 262. Both the output 276 of the first operational amplifier 240 and the output 282 of the second operational amplifier 242 are coupled to the cathode 239 of the diode 238 via a resistor 246. The cathode 239 of the diode 238 is also coupled to a positive supply voltage (e.g., +5V) 266 via a resistor 244.

The anode 241 of the diode 238 is coupled to a node 227 within the inverter control module 200. The node 227 is coupled to a UPS control line 228 (e.g., from the UPS controller 180) via a resistor 285 and to ground 229 via a capacitor 287. The node 227 is also coupled to the first switch 208 via a control line 294 and to the second switch 224 via a control line 296.

The output 211 of the first switch 208 is coupled to the voltage controller 212. The output 231 of the second switch 224 is coupled to the voltage controller 212 as feedback. A first input 223 of the second switch 224 is coupled to the output 118 of the UPS 100. A second input 225 of the second switch 224 is coupled to ground 229. The voltage controller 212 is coupled to the current controller 216. The current controller 216 is also coupled to the output 167 of the inverter 108 and is configured to receive an indication of current at the output 167 of the inverter 108 (e.g., via a Hall Effect sensor 222 coupled to the output 167) as feedback. For example, in one embodiment, the Hall Effect sensor 222, coupled to the output 167, provides a voltage signal to the current controller 216, as feedback, that is proportionate to the current 176 at the output 167 of the inverter 108. The current limit circuit 220 is coupled to the output 118 of the UPS 100 (e.g., via the Hall Effect sensor 222). The current controller 216 and the current limit circuit are also coupled to the NAND gate logic 218. The NAND gate logic is coupled to the gates 130, 136, 141, 146 of the switches 116, 118, 120, 122.

The Hall Effect sensor 168 is coupled to the bypass line 112 and is configured to provide an indication of current in the bypass line 112 to the bypass current direction detection circuit 202. Based on the indication of current in the bypass line 112 received from the hall effect sensor 168, the comparator 226 outputs, to the inverter control module 200, a square wave, the polarity of which depends on the direction (i.e., polarity) of the current 172 in the bypass line 112. For example, according to one embodiment, the square wave output of the comparator 226 is positive when the current 172 in the bypass line 112 is positive and negative when the current 172 in the bypass line 112 is negative; however, in other embodiments, the square wave generated by the comparator 226 may be configured differently. Accordingly, the bypass current direction detection circuit 202 provides the inverter control module 200 with an indication of the direction of current 172 in the bypass line 112.

The Hall Effect sensor 168 is also configured to provide an indication of current in the bypass line 112 to the bypass current magnitude detection circuit 204. Based on the indication of current in the bypass line 112 received from the Hall Effect sensor 168, the level comparator 236 outputs (e.g., to the cathode 239 of the diode 238) a generally low signal that includes pulses near each zero crossing of the current 172 in the bypass line 112. The output of the level comparator 236 remains low as long as there is current 172 in the bypass line 112 above a threshold level. The output of the level comparator 236 rises (i.e., pulses) when the current 172 in the bypass line 112 drops below the threshold level (e.g., a threshold level close to zero). Accordingly, the level comparator 236 provides an indication to the inverter control module 200 when the current 172 in the bypass line 112 is below the threshold level.

As described above, based on the AC power received from AC mains 103, the UPS 100 is configured to operate in different modes of operation. In a "bypass" mode of operation, the inverter 108 is disabled and in a "battery" or "online" mode of operation, the inverter 108 is enabled. According to one embodiment, the operational state of the inverter (i.e., the operational state of the switches 116, 118, 120, 122) is controlled by an inverter control signal (e.g., from the UPS controller 180) that controls whether the inverter 108 is on or off (i.e., whether the switches 116, 118, 120, 122 are enabled or disabled). For example, in one embodiment, a low inverter control signal from the UPS controller 180 turns off the inverter 108 (i.e., disables the switches 116, 118, 120, 122) and a high inverter control signal from the UPS controller 180 turns on the inverter 108 (i.e., enables the switches 116, 118, 120, 122). In other embodiments, the inverter control signal may be configured differently. According to one embodiment, the inverter control signal provided by the UPS controller 180 to the inverter 108 is also provided to the inverter control module 200 via the inverter control line 228.

When the UPS 100 is in "bypass" mode, the backfeed relay 102, bypass relay 114, and inverter relay 110 are closed, the inverter 108 is disabled (i.e., the switches 116, 118, 120, 122 are disabled), and the input 101 of the UPS 100 (coupled to AC mains 103) is coupled directly to the output 118 of the UPS 100 via the bypass line 112. As described above, the inverter 108 is disabled through the disabling of the switches 116, 118, 120, 122 within the inverter 108 by a low inverter control signal from the UPS controller 180. While the UPS 100 is in "bypass" mode, the low inverter control signal (INV_EN) from the UPS controller 180 is also provided to the inverter control module 200 via the inverter control line 228

The low inverter control signal (INV_EN) on the inverter control line 228 is provided to the first switch via the control line 294 and operates the first switch 208 to selectively couple the output 243 of the operational amplifier 230 (i.e., the output of the bypass current direction detection circuit 202) to the voltage controller 212. The low inverter control signal (INV_EN) is also provided to the second switch 224 via the control line 296 and operates the second switch 224 to selectively couple ground 229 to the voltage controller 212 as feedback. Accordingly, while the UPS 100 is in "bypass" mode, the feedback provided to the voltage controller 212 is zero and the voltage reference signal 290 provided to the voltage controller is the output square wave of the bypass current direction detection circuit 202 (indicating the direction of the bypass current 172 as discussed above).

The voltage controller 212 receives the output square wave of the bypass current direction detection circuit 202 (indicating the direction of the bypass current 172) and, in response, outputs a current reference signal 292 to the current controller 216 that is in the same direction (i.e., has the same polarity) as that of the bypass current 172. In addition, while the UPS 100 is in "bypass mode", the bypass current 172 in the bypass line 112 drives the level comparator 236 of the bypass current magnitude detection circuit 204 to produce a low signal with pulses near each zero crossing of the bypass current 172. However, as the inverter control signal (INV_EN) on the inverter control line 228 is low, diode 238 is reverse biased and the control signal to each one of the switches 208, 224 remains low.

In the event of AC mains 103 failure detection (e.g., due to a sag, swell, brownout, or blackout condition), the bypass relay 114 is driven open and the inverter 108 is turned on. According to one embodiment, the bypass relay 114 is fully opened prior to the inverter 108 being turned on. For example, in one embodiment, the turning on of the inverter 108 is delayed at least 2 ms to allow the bypass relay 114 to be fully opened; however, in other embodiments, other delays may be implemented. According to another embodiment, where the bypass relay 114 is replaced by a Silicon-Controlled Rectifier (SCR), the turning off of the SCR and the turning on of the inverter 108 may be done simultaneously.

As described above, the UPS controller 180 turns on the inverter 108 by driving the inverter control signal (INV_EN) high. The high inverter control signal (INV_EN) is also provided to the inverter control module 200 via the inverter control line 228. However, even though the high inverter control signal (INV_EN) is provided to the inverter control line 228, if there is still current 172 in the bypass line 112 (e.g., due to arcing as described above), the control signals provided to the first and second switches 208, 224, via the control lines 294, 296, remain low as the output of the level comparator 236 also remains low (due to the current 172 in the bypass line 112). A low control signal provided from the node 227 to the first switch 208 via the control line 294 continues to operate the first switch 208 to selectively couple the output 243 of the operational amplifier 230 (i.e., the output of the bypass current direction detection circuit 202) to the voltage controller 212. A low control signal provided from the node 227 to the second switch 224 via the control line 296 also continues to operate the second switch 224 to selectively couple ground 229 to the voltage controller 212 as feedback.

Accordingly, while current 172 flows in the bypass line 112, the feedback provided to the voltage controller 212 is zero and the voltage reference signal 290 provided to the voltage controller is the output square wave of the bypass current direction detection circuit 202 (indicating the direction of the bypass current 172 as discussed above). The voltage controller 212 receives the output square wave of the bypass current direction detection circuit 202 (indicating the direction of the bypass current 172) and, in response, outputs a current reference signal 292 to the current controller 216 that is in the same direction (i.e., has the same polarity) as that of the bypass current 172.

Based on the current reference signal 292 (indicating the direction of the current 172 in the bypass line 112) and a feedback signal (e.g., from the Hall Effect sensor 222 coupled to the output 167 of the inverter 108) providing an indication of current at the output 167 of the inverter 108, the current controller 216 (through the NAND gate logic 218) transmits pulses 170 to the gates 130, 136, 141, 146 of the switches 116, 118, 120, 122 to control the inverter 108 to supply current 176 to the output 167 in the opposite direction (i.e., with the opposite polarity) to that of the current 172 in the bypass line 112. By supplying current 176 to the output 167 in the opposite direction to that of the current 172 in the bypass line 112, the current 172 in the bypass line 112 is forced to zero. By force commutating the current 172 in the bypass line 112, the inverter 108 may be prevented from shorting to AC mains 113. The inverter 108 may act as a current source (providing current 176 in the opposite direction to that of the current 172) as long as there is current 176 in the bypass line 112 above a threshold level.

Once current 176 in the bypass line 112 falls below the threshold level, the indication of current in the bypass line 112, from the Hall Effect sensor 168, goes below a predetermined level. In response to the indication of current in the bypass line 112 going below the predetermined level, the output of the level comparator 236 goes high. Accordingly, the control signal from the node 227 to the first switch 208 via the control line 294 and the control signal from the node 227 to the second switch 224 via the control line 296 also goes high. In response to a high control signal via the control line 294, the first switch 208 selectively couples the sine wave reference generation circuit 206 to the voltage controller 212 and in response to a high control signal via the control line 296, the second switch 224 selectively couples the output 167 of the inverter 108 to the voltage controller 212 as feedback.

Based on a reference sine wave from the sine wave reference generation circuit 206 and a voltage feedback signal from the output 167 of the inverter 108, the voltage controller generates a current reference signal 292. According to one embodiment, the sine wave reference generation circuit 206 is part of a Digital Signal Processor (DSP); however, in other embodiments, the sine wave reference generation circuit 206 may be configured differently. Based on the current reference signal 292 and a feedback signal (e.g., from the Hall Effect sensor 222 coupled to the output 167 of the inverter 108) providing an indication of current at the output 167 of the inverter 108, the current controller 216 (through the NAND gate logic 218) transmits pulses 170 to the gates 130, 136, 141, 146 of the switches 116, 118, 120, 122 to control the inverter 108 to supply desired AC power to the load 166.

According to one embodiment, the inverter control module 200 also includes a current limit circuit 220. The current limit circuit 220 is configured to monitor current at the output 167 of the inverter 108 (e.g., via the Hall Effect sensor 222) and limit the pulses 170 transmitted to the switches 116-122 so that output current generated by the inverter 108 does not exceed a current limit of the UPS 100.

By force commutating the current 172 in the bypass line 112 while turning on the inverter 108, the inverter 108 is prevented from shorting to AC mains 103. In addition, the transfer time delay between disconnecting the bypass line 112 and turning on the inverter 108 may be reduced to as low as 1 ms. According to one embodiment, where the turning on of the inverter is delayed (e.g., 2 ms) to allow the bypass relay to fully open as discussed above, the total transfer time delay between disconnecting the bypass line 112 and turning on the inverter 108 may be reduced to as low as 3 ms.

Figure 3:
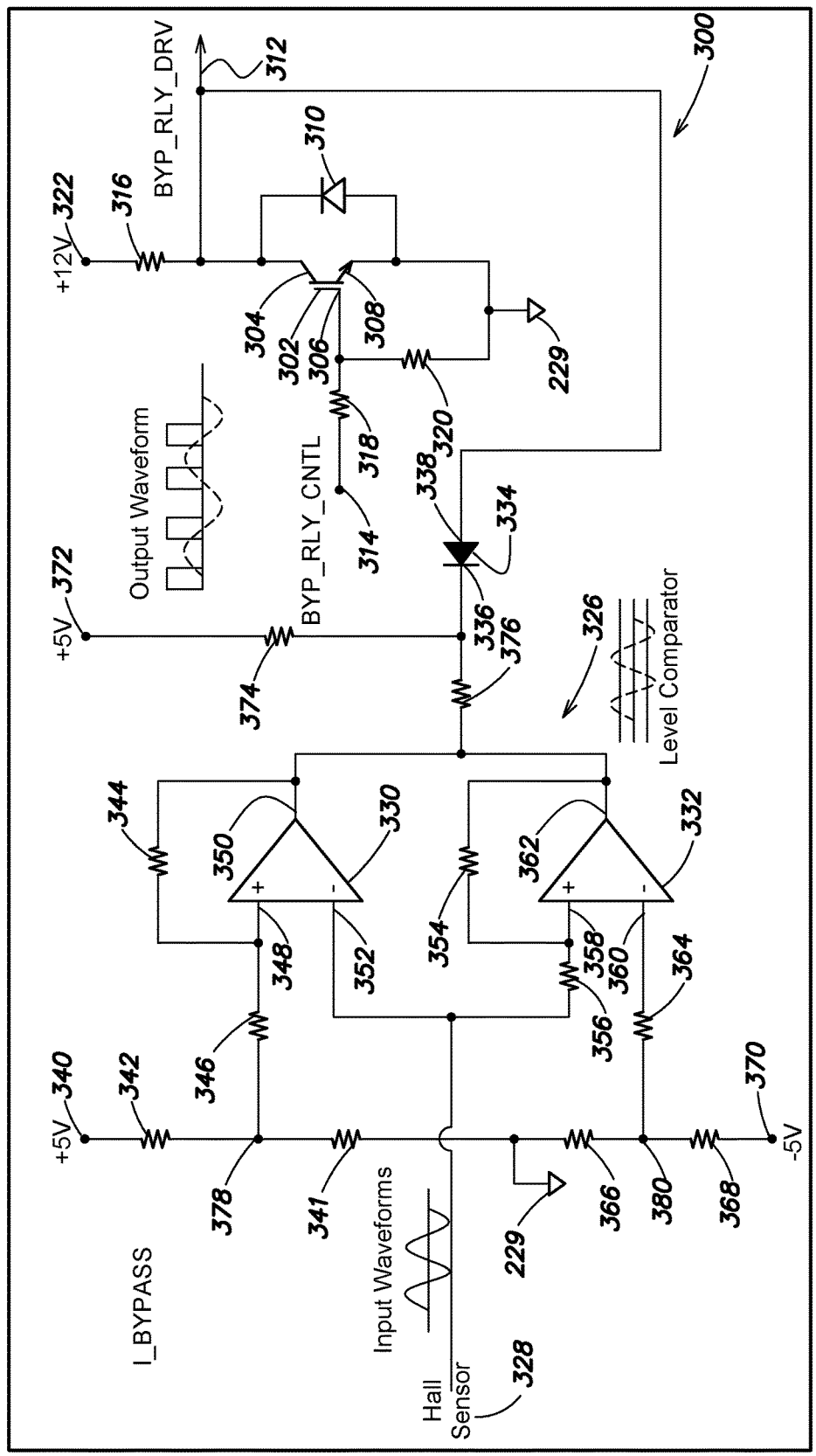
FIG. 3 illustrates a bypass relay protection circuit according to aspects of the current invention.

According to one embodiment, the inverter controller 117 also includes a bypass relay protection circuit. FIG. 3 illustrates one embodiment of a bypass relay protection circuit 300. The bypass relay protection circuit 300 includes a transistor 302, a bypass relay control line 314, a bypass relay drive line 312, a level comparator 326, and a diode 334. The base 306 of the transistor is coupled to the bypass relay control line 314 via a resistor 318 and to ground 229 via the resistor 320. The emitter 308 of the transistor 302 is coupled to ground 229. A diode 310 is coupled between the emitter 308 and the collector 304 of the transistor 302. The collector 304 of the transistor 302 is coupled to a voltage supply 322 (e.g., +12V) via a resistor 316. The bypass relay drive line 312 is coupled between the collector 304 of the transistor 302 and the bypass relay 114. The bypass relay drive line 312 is also coupled to the anode 338 of the diode 334. The bypass relay control line 314 is coupled to the UPS controller 180.

The level comparator 326 includes a first operational amplifier 330, a second operational amplifier 332, and a plurality of resistors 342-376. The positive terminal 348 of the first operational amplifier 330 is coupled to the output 350 of the operational amplifier 330 via the resistor 344. The positive terminal 348 of the first operational amplifier 330 is coupled to a node 378 via a resistor 346. The node 378 is coupled to a voltage supply 340 (e.g., +5V) via a resistor 342. The node 378 is also coupled to ground 229 via resistor 341. The negative terminal 352 of the first operational amplifier 330 is coupled to the positive terminal 359 of the second operational amplifier 352 via a resistor 356. The positive terminal 358 of the second operational amplifier 332 is coupled to the output 362 of the second operational amplifier 332 via a resistor 354. The negative terminal 360 of the second operational amplifier 332 is coupled to a node 380 via a resistor 364. The node 380 is also coupled to ground via a resistor 366 and to a voltage supply 370 (e.g., −5V) via a resistor 368.

The negative terminal 352 of the first operational amplifier 330 is also coupled to the bypass line 112 via a Hall Effect sensor 328. The output 350 of the first operational amplifier 330 and the output 362 of the second operational amplifier 332 are both coupled to the cathode 336 of the diode 334. The cathode 336 is also coupled to a voltage supply 372 (e.g., +5V) via a resistor 374.

The bypass relay protection circuit 300 is configured to prohibit operation of the bypass relay 114 if current 172 in the bypass line 112 is too high (i.e., above a threshold or cutoff level). Operation of the bypass relay 114 (i.e., switching) at such a high current above the threshold may reduce reliability of the UPS 100 and/or damage the UPS 100. Therefore, the bypass relay protection circuit 300 prohibits operation of the bypass relay 114 in response to detection of a current 172 in the bypass line 112 that is high (i.e., above a threshold) due to a condition such as a short circuit, overload, or peak load charging condition in the UPS 100.

According to one embodiment, the threshold level is defined by the level comparator 326. The level comparator 326 receives, from the Hall Effect sensor 328 coupled to the bypass line 112, an indication of the current 172 in the bypass line 112. If the current 172 in the bypass line 112 is above a threshold level defined by the level comparator 326, then the level comparator 326 outputs a low signal. In response to the low signal from the level comparator 326, the bypass relay protection circuit 300 provides a high control signal on the bypass relay drive line 312 (to maintain the bypass relay 112 closed), regardless of any control signal received from the UPS controller 180 on the bypass relay control line 314.

Alternatively, if the current 172 in the bypass line 112 is below a threshold level defined by the level comparator 326, then the level comparator 326 outputs a high signal. In response to the high signal from the level comparator 326, the bypass relay protection circuit 300 allows the bypass relay control signal (high or low) from the UPS controller 180 (received on the bypass relay control line 314) to pass to the bypass relay 114 via the bypass relay drive line 312 to control the state of the bypass relay 114. Accordingly, if the current 172 on the bypass line 112 is above a threshold set by the level comparator 326, the bypass relay protection circuit 300 does not allow the UPS controller 180 to operate the bypass relay 114 and if the current 172 on the bypass line 112 is below a threshold set by the level comparator 326, the bypass relay protection circuit 300 allows the UPS controller 180 to control operation of the bypass relay 114.

As described herein, the inverter controller 117 is configured for use with an inverter 108 including a plurality of IGBT switches 116-122; however, in other embodiments, the inverter controller 117 may be utilized with any other type of inverter 108.

As shown herein, the UPS controller 180 and the inverter controller 117 are separate components; however, in some embodiments, the functions of the UPS controller 180 and the inverter controller 117 may be performed by the same controller or processor.

As described herein, the inverter controller 117 is utilized with an online UPS; however, in other embodiments, the inverter controller 117 may be utilized with other types of UPSs.

As also described herein, the UPS 100 includes a bypass relay 114 and an inverter relay 110; however, in other embodiments, the bypass relay 114 and inverter relay 110 may be replaced by other types of switches.

Accordingly, embodiments described herein provide a UPS control architecture in which, upon transfer from a bypass mode to an online or battery mode, an inverter within an online UPS is operated as a current source to deliver current in a direction opposite to that of current in the bypass line. By force commutating the current in the bypass line while turning on the inverter, the inverter may be prevented from shorting to AC mains. In addition, the transfer time delay between disconnecting the bypass line and turning on the inverter may be reduced to as low as 1 ms. Once current in the bypass line goes to zero, the inverter is run as a voltage source converter.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:
1. An Uninterruptible Power Supply (UPS) comprising:
a first input configured to be coupled to an AC source and to receive input power;
a second input configured to be coupled to a backup power source to receive backup power;
an output configured to be coupled to a load and to provide output AC power to the load derived from at least one of the input power and the backup power;
a bypass line selectively coupled between the first input and the output via a bypass switch, wherein the bypass switch is configured to close in a first mode of operation, coupling the first input of the UPS to the output of the UPS via the bypass line, and to open in a second mode of operation, decoupling the first input of the UPS from the output of the UPS;
an inverter comprising an input configured to receive at least one of the input power and the backup power and an output selectively coupled to the output of the UPS via an inverter switch, wherein the inverter switch is configured to close in the second mode of operation, coupling the output of the inverter to the output of the UPS, and to open in the first mode of operation, decoupling the output of the inverter from the output of the UPS; and
an inverter controller coupled to the inverter and to the bypass line, wherein the inverter controller is configured, in the second mode of operation, to monitor current in the bypass line and, in response to a determination that the current in the bypass line is greater than a threshold level, to operate the inverter to provide current to the output of the UPS having a direction opposite to a direction of the current in the bypass line.

2. The UPS of claim 1, wherein the inverter controller is further configured, in the second mode of operation and in response to a determination that the current in the bypass line is less than the threshold level, to operate the inverter to provide AC power to the output of the UPS.

3. The UPS of claim 2, wherein the inverter controller is coupled to the bypass line via a current sensor.

4. The UPS of claim 3, wherein the inverter controller comprises:
an inverter control module coupled to the inverter; and
a bypass current magnitude detection circuit coupled to the inverter control module and to the current sensor, wherein, in the second mode of operation, the bypass current magnitude detection circuit is configured to receive an indication of current in the bypass line from the current sensor and, based on the indication of current in the bypass line, to provide an indication to the inverter control module whether current in the bypass line is greater than the threshold level.

5. The UPS of claim 4, wherein, in response to an indication that the current in the bypass line is greater than the threshold level, the inverter control module is configured to control the inverter to operate as a current source.

6. The UPS of claim 4, wherein, in response to an indication that the current in the bypass line is less than the threshold level, the inverter control module is configured to control the inverter to operate as a voltage source.

7. The UPS of claim 4, wherein the inverter controller further comprises a bypass current direction detection circuit coupled to the inverter control module and the current sensor and configured to receive an indication of current in the bypass line from the current sensor and, based on the indication of current in the bypass line, to provide an indication of the direction of the current in the bypass line to the inverter control module.

8. The UPS of claim 1, further comprising a UPS controller coupled to the first input, the bypass switch and the inverter switch,
wherein the UPS controller is configured to monitor the AC power at the first input,
wherein, in response to a determination that the AC power at the first input is acceptable, the UPS controller is further configured to control the UPS to operate in the first mode of operation, and wherein, in response to a determination that the AC power at the first input is not acceptable, the UPS controller is further configured to control the UPS to operate in the second mode of operation.

9. The UPS of claim 8, wherein in the second mode of operation, the output is configured to provide output AC power to the load derived from the backup power.

10. The UPS of claim 8, wherein in the second mode of operation, the output is configured to provide output AC power to the load derived from the input power.

11. The UPS of claim 1, further comprising a bypass relay protection circuit coupled to the bypass switch and configured to monitor the current in the bypass line and prevent operation of the bypass switch in response to a determination that the current in the bypass line is above a cutoff level.

12. A method for operating a UPS, the UPS having an input, an output, a bypass line selectively coupled between the input and the output, and an inverter, the method comprising:
   monitoring input AC power provided to the input of the UPS from an AC power source;
   determining whether the input AC power provided to the input is acceptable;
   in response to a determination that the input AC power is acceptable, providing the input AC power to the output of the UPS via the bypass line;
   in response to a determination that the input AC power is not acceptable, severing the connection between the input and the output via the bypass line and enabling the inverter;
   monitoring current in the bypass line;
   determining, in response to monitoring, whether the current in the bypass line exceeds a threshold level; and
   in response to a determination that current in the bypass line exceeds the threshold level, operating the inverter to provide an output current to the output of the UPS having a direction opposite to a direction of the current in the bypass line.

13. The method of claim 12, further comprising in response to a determination that current in the bypass line does not exceed the threshold level, operating the inverter to provide output AC power at a controlled voltage to the output of the UPS.

14. The method of claim 13, wherein operating the inverter to provide output AC power to the output of the UPS comprises:
   receiving a reference sine wave signal from a sine wave reference generation circuit;
   monitoring voltage at the output of the inverter; and
   operating the inverter to provide the output AC power to the output of the UPS based on the reference sine wave signal and the monitored voltage at the output of the inverter.

15. The method of claim 12, wherein operating the inverter to provide an output current to the output of the UPS having a direction opposite to a direction of the current in the bypass line includes operating the inverter as a current source.

16. The method of claim 15, wherein operating the inverter as a current source comprises:
   receiving an indication of current in the bypass line from a current sensor coupled to the bypass line;
   determining, with a direction detection circuit, the direction of current in the bypass line; and
   transmitting, based on determining the direction of current in the bypass line, signals to the inverter to control the inverter to provide the output current having a direction opposite to the direction of the current in the bypass line.

17. The method of claim 12, wherein severing the connection between the input and the output via the bypass line includes opening a bypass switch selectively coupled between the input and the output on the bypass line.

18. The method of claim 12, wherein enabling the inverter includes closing an inverter switch coupled between an output of the inverter and the output of the UPS.

19. The method of claim 12, further comprising preventing severance of the connection between the input and the output via the bypass line in response to a determination that the current in the bypass line exceeds a cutoff level.

20. An Uninterruptible Power Supply (UPS) comprising:
   a first input configured to be coupled to an AC source and to receive input power;
   a second input configured to be coupled to a backup power source to receive backup power;
   an output configured to be coupled to a load and to provide output AC power to the load derived from at least one of the input power and the backup power;
   a bypass line selectively coupled between the first input and the output via a bypass switch, wherein in a bypass mode of operation, the bypass switch is closed and the input power is provided directly to the output;
   an inverter comprising an input configured to receive at least one of the input power and the backup power and an output selectively coupled to the output of the UPS via an inverter switch, wherein in an online mode of operation, the inverter switch is closed, the inverter receives the input power, and the inverter converts the input power into the output AC power; and
   means for operating the inverter to force commutate current in the bypass line after a transition from the bypass mode of operation to the online mode of operation.

* * * * *